(12) United States Patent
Williams

(10) Patent No.: US 8,009,379 B2
(45) Date of Patent: Aug. 30, 2011

(54) METHOD, APPARATUS AND PROGRAM STORAGE DEVICE FOR DYNAMICALLY ADJUSTING THE WRITE CURRENT IN EACH HEAD TO COMPENSATE FOR VARIATION IN DISK DRIVE AND ENVIRONMENTAL PARAMETERS

(75) Inventor: Larry L. Williams, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 881 days.

(21) Appl. No.: 10/884,328

(22) Filed: Jun. 30, 2004

(65) Prior Publication Data

US 2006/0001994 A1    Jan. 5, 2006

(51) Int. Cl.
     *G11B 5/02*      (2006.01)
(52) U.S. Cl. ............................................. 360/68; 360/69
(58) Field of Classification Search .................. None
     See application file for complete search history.

(56) References Cited

U.S. PATENT DOCUMENTS

| | | | |
|---|---|---|---|
| 5,600,500 A | 2/1997 | Madsen et al. | |
| 5,808,820 A | 9/1998 | Iwama | |
| 6,064,534 A | 5/2000 | Simozato | 360/46 |
| 6,075,664 A | 6/2000 | Shimizu | |
| 6,101,053 A * | 8/2000 | Takahashi | 360/46 |
| 6,188,531 B1 * | 2/2001 | Chang et al. | 360/46 |
| 6,301,068 B1 | 10/2001 | Ionescu | |
| 6,310,740 B1 | 10/2001 | Dunbar et al. | |
| 6,405,277 B1 * | 6/2002 | Jen et al. | 360/75 |
| 6,798,598 B2 * | 9/2004 | Suzuki et al. | 360/68 |
| 6,914,738 B2 * | 7/2005 | Fujiwara et al. | 360/68 |
| 6,954,320 B2 * | 10/2005 | Yang | 360/46 |
| 6,972,920 B2 * | 12/2005 | Kim et al. | 360/67 |
| 6,999,256 B2 * | 2/2006 | Kim et al. | 360/68 |
| 7,009,800 B2 * | 3/2006 | Yang | 360/68 |
| 7,023,641 B2 * | 4/2006 | Doi et al. | 360/68 |
| 7,095,576 B2 * | 8/2006 | Kim et al. | 360/68 |
| 7,095,577 B1 * | 8/2006 | Codilian et al. | 360/68 |
| 7,102,838 B2 * | 9/2006 | Kim et al. | 360/31 |
| 7,117,399 B2 * | 10/2006 | Song | 360/53 |
| 7,126,778 B2 * | 10/2006 | Lamberts | 360/69 |
| 7,170,700 B1 * | 1/2007 | Lin et al. | 360/31 |

(Continued)

FOREIGN PATENT DOCUMENTS

JP      1144203      6/1989

(Continued)

OTHER PUBLICATIONS

Nov. 1994, IBM Technical Disclosure Bulletin, "Optimal Recording Head Performance Through Programmable Write Current," vol. 37, No. 11, pp. 297-298.

*Primary Examiner* — Hoa T Nguyen
*Assistant Examiner* — James L Habermehl
(74) *Attorney, Agent, or Firm* — Merchant & Gould

(57) ABSTRACT

A method, apparatus and program storage device for dynamically adjusting the write current in each head to compensate for variation in disk drive and environmental parameters is disclosed. A current in the write head is dynamically adjusted to compensate for variations in the components and environment by periodically measuring the writability of the drive and adjusting the write current such that the parameter stays within predetermined criteria.

25 Claims, 9 Drawing Sheets

U.S. PATENT DOCUMENTS

| | | | |
|---|---|---|---|
| 7,212,361 B1 * | 5/2007 | Pederson et al. | 360/31 |
| 7,253,978 B2 * | 8/2007 | Lee et al. | 360/68 |
| 7,575,820 B2 * | 8/2009 | Silva | 360/46 |
| 2002/0141094 A1 | 10/2002 | Suzuki et al. | |
| 2003/0223143 A1 | 12/2003 | Fujiwara et al. | |
| 2005/0207296 A1 * | 9/2005 | Silva | 369/47.36 |

FOREIGN PATENT DOCUMENTS

| | | |
|---|---|---|
| JP | 4285703 | 10/1992 |
| JP | 7014107 | 1/1995 |
| JP | 63213104 | 9/1998 |
| JP | 2001143209 | 5/2001 |

* cited by examiner

METHOD, APPARATUS AND PROGRAM STORAGE DEVICE FOR DYNAMICALLY ADJUSTING THE WRITE CURRENT IN EACH HEAD TO COMPENSATE FOR VARIATION IN DISK DRIVE AND ENVIRONMENTAL PARAMETERS

BACKGROUND OF THE INVENTION

1. Field of the Invention

This disclosure relates in general to magnetic storage systems, and more particularly to a method, apparatus and program storage device for dynamically adjusting the write current in each head to compensate for variation in disk drive and environmental parameters.

2. Description of Related Art

Disk drives are used as primary data storage devices in modern computer systems and networks. A typical disk drive comprises one or more rigid magnetizable storage disks, which are rotated by a spindle motor at a high speed. An array of read/write heads transfer data between tracks of the disks and a host computer. The heads are mounted to an actuator assembly that is positioned so as to place a particular head adjacent the desired track.

Information is written on each disk in a plurality of concentric tracks by a transducer assembly mounted on an actuator arm. Typically, the transducer assembly is suspended over the disk from the actuator arm in a slider assembly, which includes air bearing surfaces designed to interact with a thin layer of moving air generated by the rotation of the disks. Transducer assemblies are said to "fly" over the disk surface as the disk rotates. To access tracks on the disk, the actuator arm moves in an arc across the disk. The physical distance between the nominal centers of two adjacent tracks is referred to as the "track pitch". The track pitch and linear track density define the storage capacity of the disk.

Each of the disks is coated with a magnetizable medium wherein the data is retained as a series of magnetic domains of selected orientation. The data are imparted to the data disk by a write element of the corresponding head. The data thus stored to the disk are subsequently detected by a read element of the head. Although a variety of head constructions have been utilized historically, magneto-resistive (MR) heads are typically used in present generation disk drives. The write element of a magnetic head uses a thin-film inductive coil arranged about a ferromagnetic core having a write gap. As write currents are passed through the coil, a magnetic write field is established emanating magnetic flux lines from the core and fringing across the write gap. The flux lines extend into the magnetizable medium to establish magnetization vectors in selected directions, or polarities, along the track on the data disk. Magnetic flux transitions are established at boundaries between adjacent magnetization vectors of opposite polarities.

To write a computer file to disk, the disk drive receives the file from the host computer in the form of input data that are buffered by an interface circuit. A write channel encodes and serializes the data to generate a data input stream that can be represented as a square-wave type signal of various lengths between rising and falling signal transitions.

A write driver circuit uses the data input stream to generate a write current which is applied to the write head, creating the magnetic write field that writes the encoded data to the magnetizable medium of the selected disk. The write current both reverses the polarity of the magnetic write field, creating the magnetic flux transitions, and sustains a given polarity between successive magnetic flux transitions.

A write head typically employs two ferromagnetic poles capable of carrying flux signals for the purpose of writing the magnetic impressions into the track of a magnetic disk or tape. The poles are fabricated on a slider with the pole tips located at the air bearing surface. Processing circuitry digitally energizes the write coil that induces flux signals into the poles. The flux signals bridge across the write gap at the air bearing surface so as to write the magnetic information into the track of the rotating disk. The thinner the thickness of the write gap layer, the greater the number of bits the write head can write into the track.

A write head is typically rated by its areal density that is a product of its linear bit density and its track width density. The linear bit density is the number of bits that can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads have resulted in computer storage capacities increasing from kilobytes to megabytes to gigabytes.

There are many parameters critical to the ability of the write head to alter the magnetic information in the media. Some of the more salient factors are the flying height of the write head (FH), the magnetic parameters of the media (coercivity, magnetic remanence, thickness), the material and physical size of the poles, and the write current. In general, most of the critical parameters have associated tolerances, both as the components are received, and as the environment of the assembly varies. Among the salient parameters, the two most important from a writing standpoint are the flying height (FH), and the media coercivity, (HC). As the mechanical tolerances of the slider vary, the flight height can either increase or decrease. Similarly, temperature or air pressure can significantly change the flying height. In a like manner, external environment such as temperature can change the coercivity of the media.

It can be seen that there is a need for a method, apparatus and program storage device for dynamically adjusting the write current in each head to compensate for variation in disk drive and environmental parameters.

SUMMARY OF THE INVENTION

To overcome the limitations described above, and to overcome other limitations that will become apparent upon reading and understanding the present specification, the present invention discloses a method, apparatus and program storage device for dynamically adjusting the write current in each head to compensate for variation in disk drive and environmental parameters.

The present invention solves the above-described problems by dynamically adjusting the current in the write head to compensate for variations in the components and environment by periodically measuring the writability of the drive and adjusting the write current such that the parameter stays within predetermined criteria.

A method for dynamically adjusting the write current in a write head in accordance with the principles of an embodiment of the present invention includes monitoring writability of a write head and dynamically adjusting write current in response to the measured writability.

In another embodiment of the present invention, a data storage system is provided. The data storage system includes a translatable recording medium for storing data thereon, a motor for translating the recording medium, a transducer disposed proximate the recording medium for reading and writing data on the recording medium, an actuator, coupled to the transducer, for moving the transducer relative to the recording medium and a signal processing system, coupled to the transducer, the signal processing system being configured for monitoring writability of a write head and dynamically adjusting write current in response to the measured writability.

In another embodiment of the present invention, a program storage device is provided. The program storage device includes program instructions executable by a processing device to perform operations for dynamically adjusting the write current in a write head, the operations including monitoring writability of a write head and dynamically adjusting write current in response to the measured writability.

In another embodiment of the present invention, a data storage system is provided. The data storage system includes means for storing data thereon, means for translating the means for storing data, means, disposed proximate the means for storing data, for reading and writing data on the means for storing data, means, coupled to the means for reading and writing data, for moving the means for reading and writing data relative to the means for storing data and means, coupled to the means for reading and writing data, for monitoring writability of a means for writing and dynamically adjusting write current in response to the measured writability.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for dynamically adjusting the write current in each head to compensate for variation in disk drive and environmental parameters. The present invention provides dynamically adjustment of the current in the write head to compensate for variations in the components and environment by periodically measuring the writability of the drive and adjusting the write current such that the parameter stays within predetermined criteria.

Figure 1:
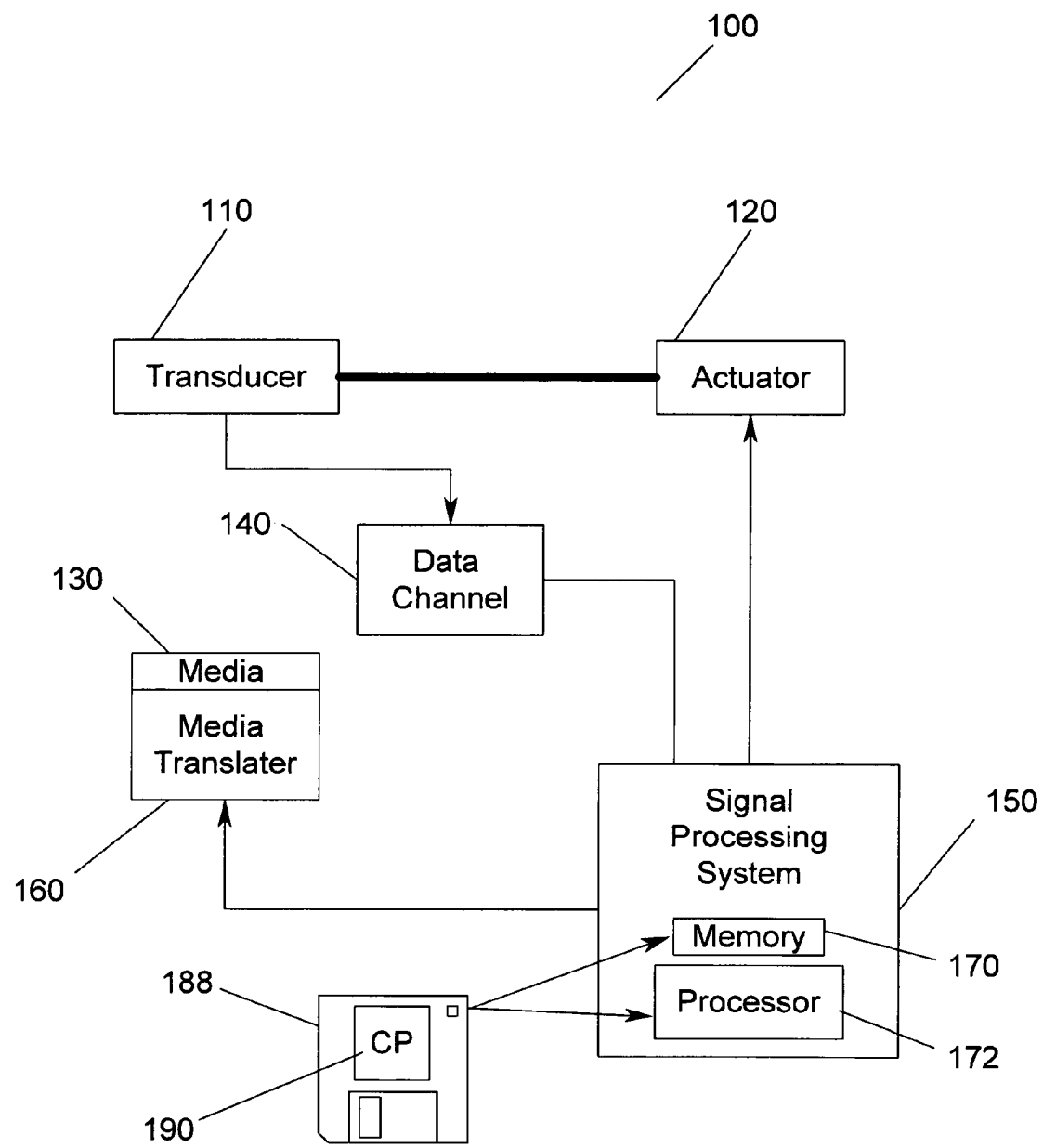
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on a magnetic recording media 130, wherein the recording media 130 is translatable so that its recordable surface may move with respect to the write head or vice versa. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
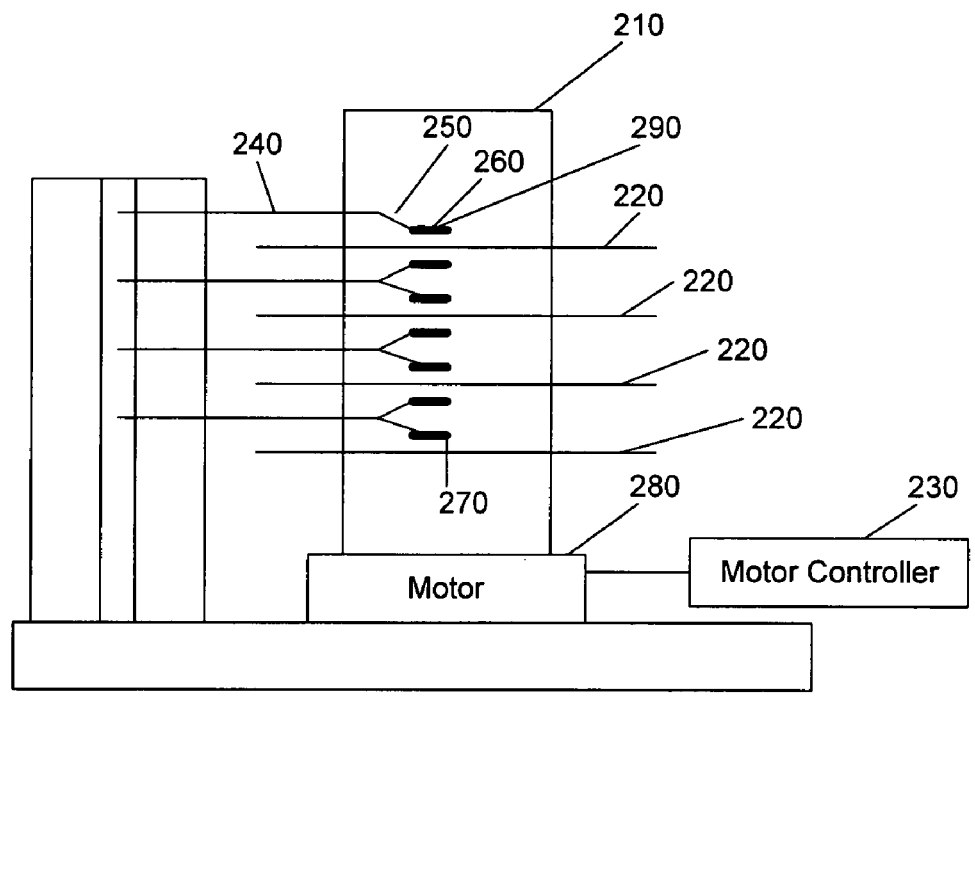
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
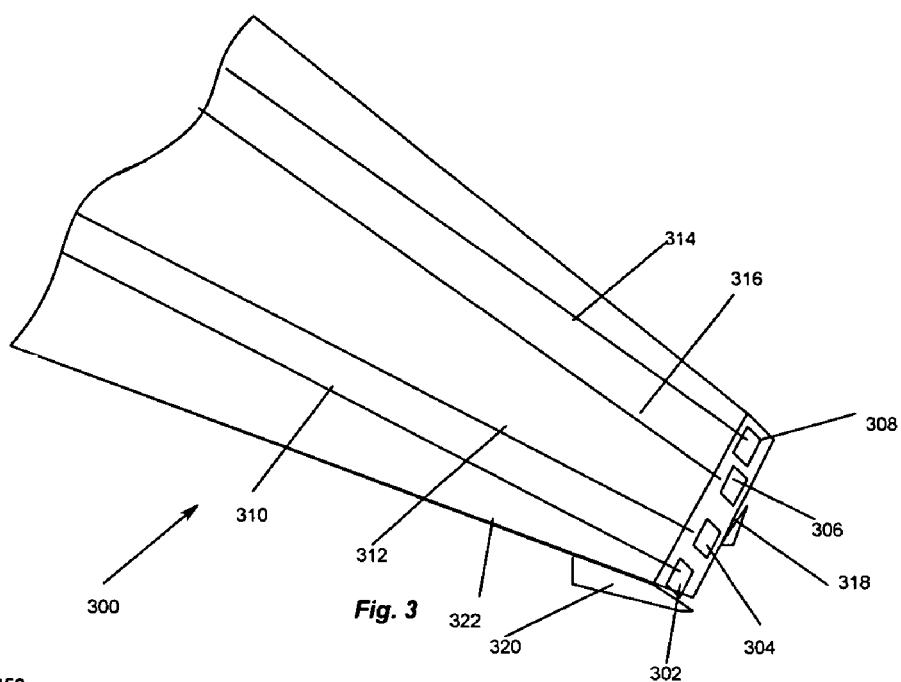
FIG. 3 illustrates a slider mounted on a suspension according to an embodiment of the present invention.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
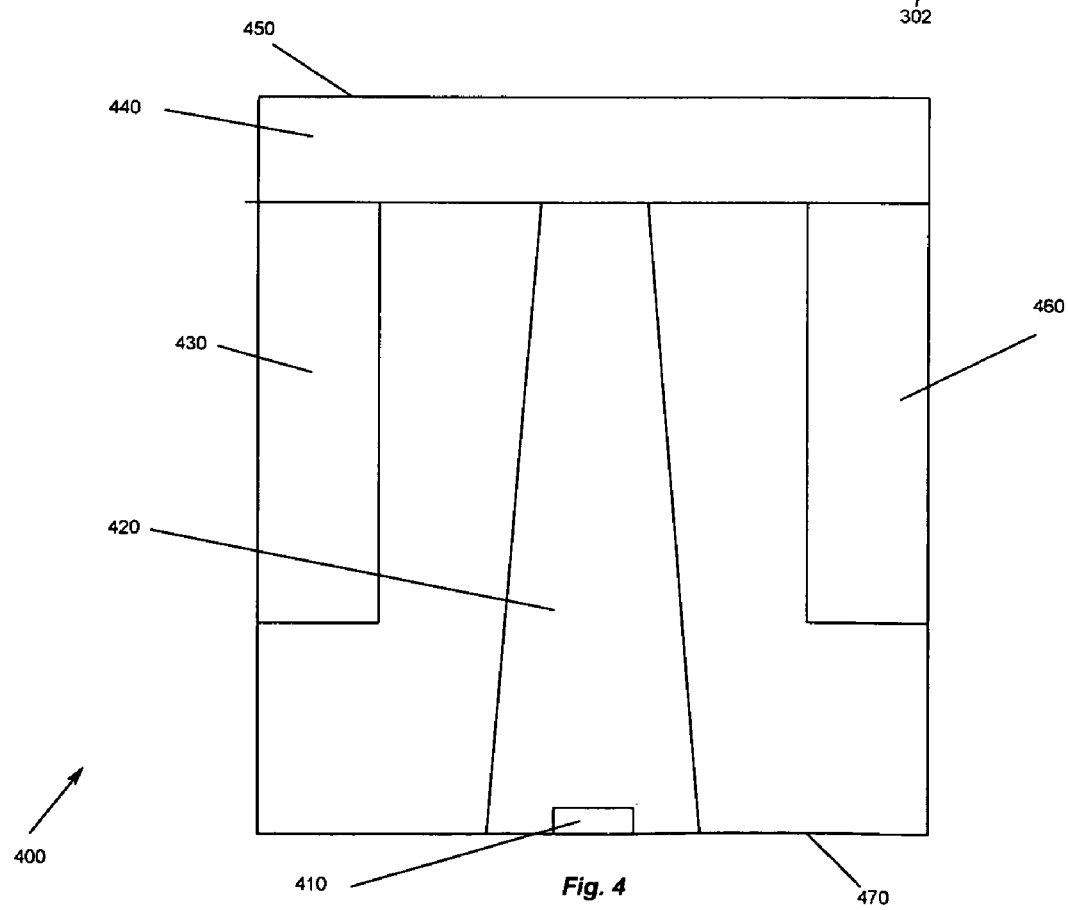
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
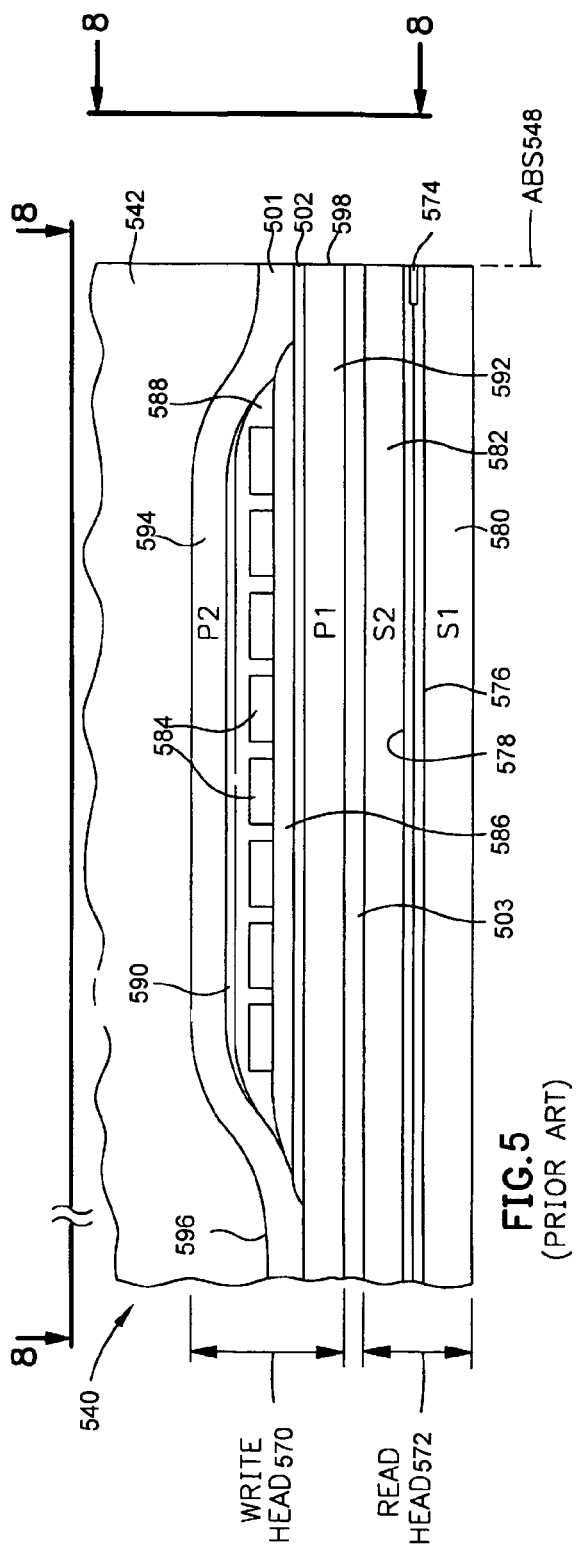
FIG. 5 is a side cross-sectional elevation view of a magnetic head.
Figure 6:
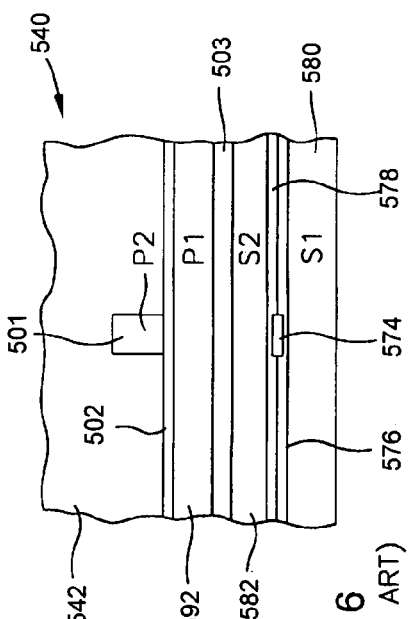
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 7:
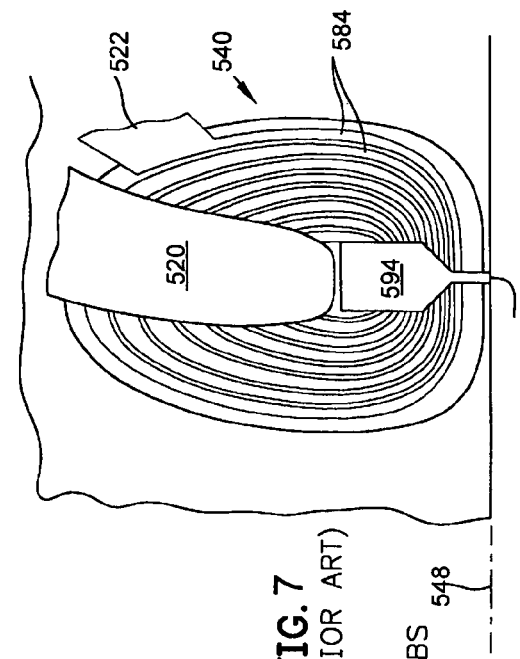
FIG. 7 illustrates the connect leads coupled to the coil for the write pole piece.

FIG. 7 illustrates a view of the connect leads 520, 522 coupled to the coil 584 for the write pole piece 594. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
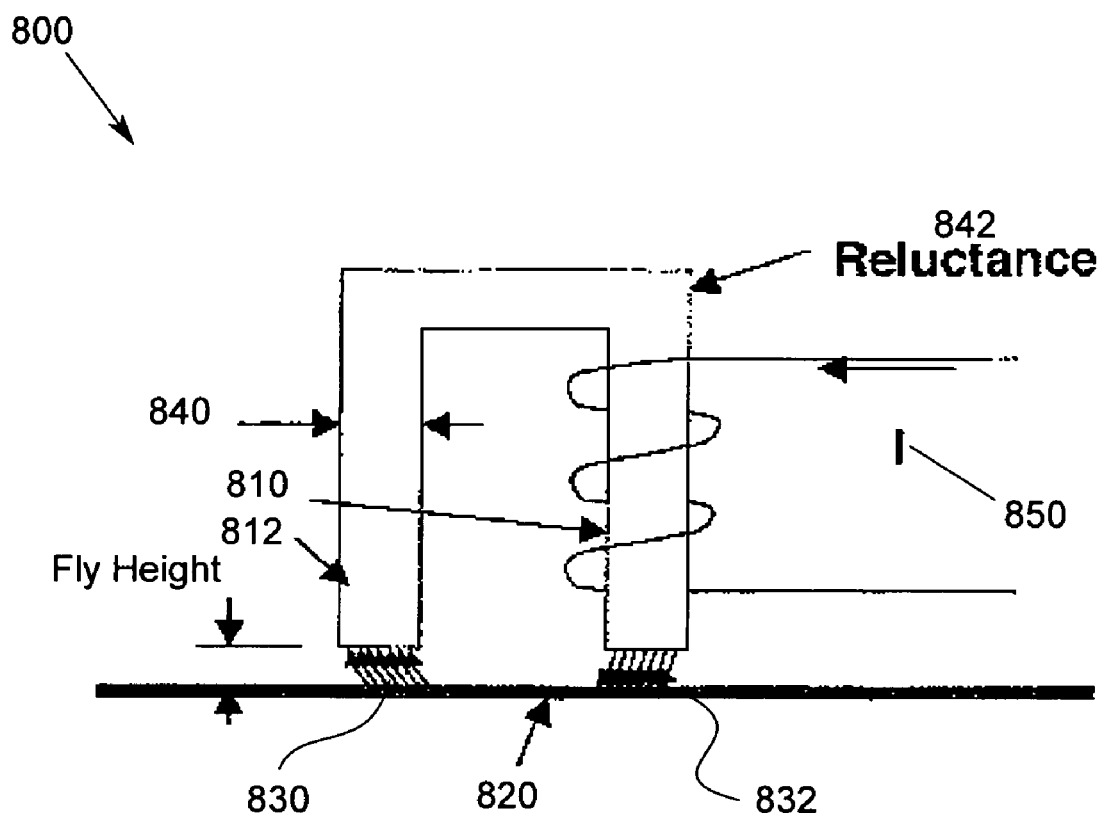
FIG. 8 is a simple illustration of a write head.

FIG. 8 is a simple illustration of a write head 800. In FIG. 8, poles 810, 812 of write head 800 are shown. The poles 810, 812 are disposed over media 820. Flux lines 830, 832 traverse between the media 820 and the poles 810, 812 of write head 800. The poles 810, 812 have a thickness 840 and reluctance 842 as shown in FIG. 8.

There are many parameters critical to the ability of the write head 800 to alter the magnetic information in the media 820. Some of the more salient factors are the flying height (FH) of the write head 800, the magnetic parameters of the media 820 (coercivity, magnetic remanence, thickness), the material and physical size of the poles 810, 812, and the write current, I 850.

In general, most of the critical parameters have associated tolerances, both as the components are received, and as the environment of the assembly varies. Among the salient parameters, the two most important from a writing standpoint are the flying height (FH), and the media coercivity, (HC). As the mechanical tolerances of a slider that includes a write head 800 vary, the flight height can either increase or decrease. Similarly, temperature or air pressure can significantly change the flying height. In a like manner, external environment such as temperature can change the coercivity of the media.

Figure 9:
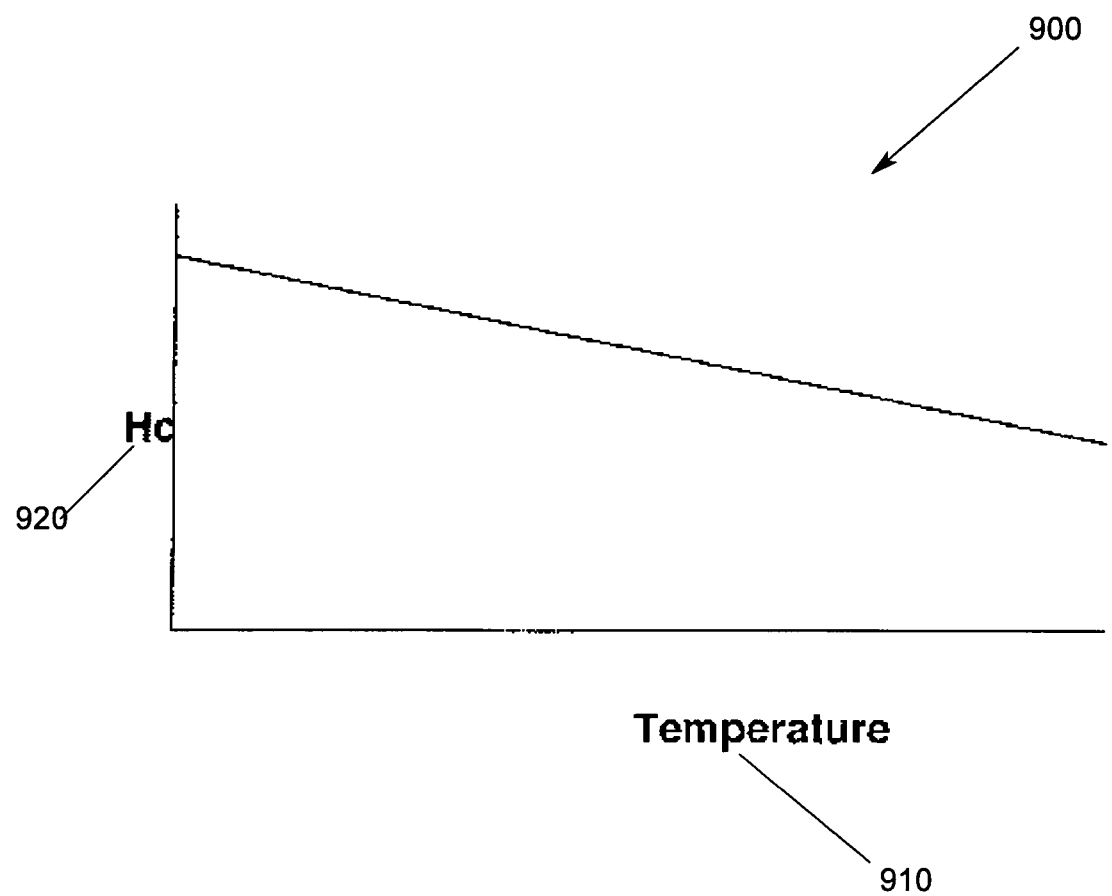
FIG. 9 is a plot of the temperature versus the coercivity of magnetic media.

FIG. 9 is a plot 900 of the temperature 910 versus the coercivity 920 of current magnetic media. In FIG. 9, the coercivity 920 decreases as temperature 910 increases. In current products, the media may have a coercivity near 4100 Oe at room temperature, and a temperature coefficient of 16 Oe/° C. In a typical application where the media environment may vary from 0° C. up to 60° C., the coercivity can range from 3620 Oe at 60° C. up to 4620 Oe at 0° C.

Figure 10:
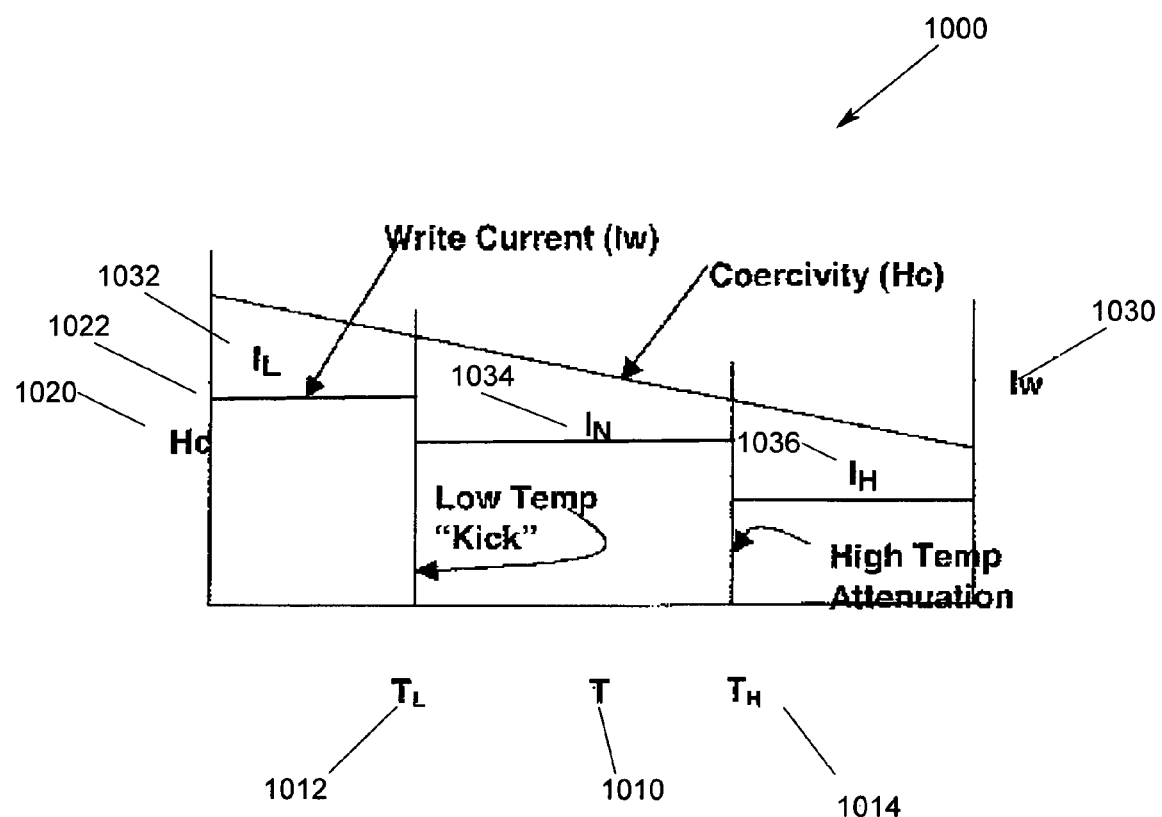
FIG. 10 is a plot of temperature versus coercivity and the effect of write current kick according to an embodiment of the present invention.

FIG. 10 is a plot 1000 of temperature 1010 versus coercivity 1020 and the effect of write current kick according to an embodiment of the present invention. In a typical design, the write current, $I_W$ 1030, is designed such that the flux from the head is sufficient to write the media at the lowest temperature and with the highest flying height. The problem is that at the other temperature extreme where the coercivity 1020 is lower, such as 60° C., the field from the write head is too high such that the information recorded on adjacent tracks can be altered. To satisfy this problem, the idea of a write current "kick" is used to satisfy the two ends of the spectrum.

In FIG. 10, at temperatures below $T_L$ 1012, the write current is increased to $I_L$ 1032 such that current is sufficient to write the media at the highest coercivity 1022. As the temperature 1010 increases above $T_L$ 1012, the write current 1030 is decreased to $I_N$ 1034, and similarly the write current 1030 is decreased still further to $I_H$ 1036 as the temperature 1010 exceeds $T_H$ 1014. In this way the write current 1030 is tailored to the thermal characteristics of the media. In this example, only two switch temperatures 1012, 1014 are shown, but in practice many switch points can be included. Nevertheless, even though the switched design is preferred, particularly as recording densities increases, there are still problems, particularly at a switch point 1012, 1014.

Figure 11:
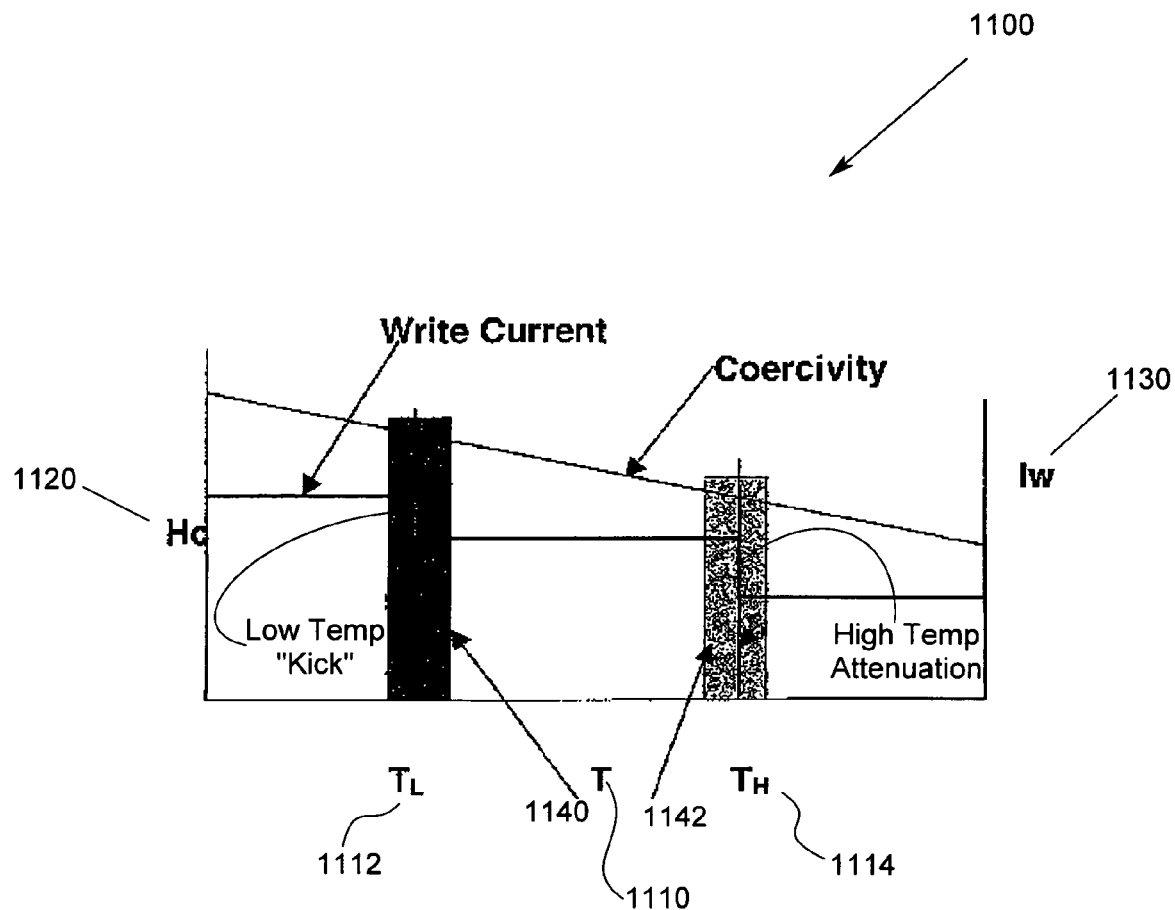
FIG. 11 is a plot of temperature versus coercivity and write current kick applied at critical zones according to an embodiment of the present invention.

FIG. 11 is a plot 1100 of temperature 1110 versus coercivity 1120 and write current kick applied at critical zones 1140, 1142 according to an embodiment of the present invention. In FIG. 11, critical zones 1140, 1142 for coercivity 1120 are shown. In FIG. 11, critical zones 1140, 1142 exist at the switch points 1112, 1114 because the coercivity does not vary significantly through the critical zone 1140, 1142 even though the write current 1130 is diminished significantly. So even though the magnetic design may work well at the highest temperature, is may be marginal at the upper half of either critical zone 1140, 1142 because the coercivity 1120 is high, but the write current 1130 is low. One solution is to utilize a multiplicity of switch zones 1140, 1142 such that the write current 1130 is more tailored to the variation of the coercivity 1120 as reflected by the measured temperature 1110.

Although this is an improvement over the initial design, there are still other factors to consider. First, of course, are any variations in the temperature coefficient of the coercivity. But in addition, variations in flying height, initial media coercivity, write current, write head material, media thickness, media magnetic remanence, temperature measurement accuracy, and pole tip geometry variations also lead to difference in the ability of the write head to write information on the media.

Rather than trying to predict the expected variations and control the write current appropriately, a magnetic storage system in accordance with an embodiment of the present invention monitors the writability of each head and dynamically adjusts the write current in response to the measured writability.

Figure 12:
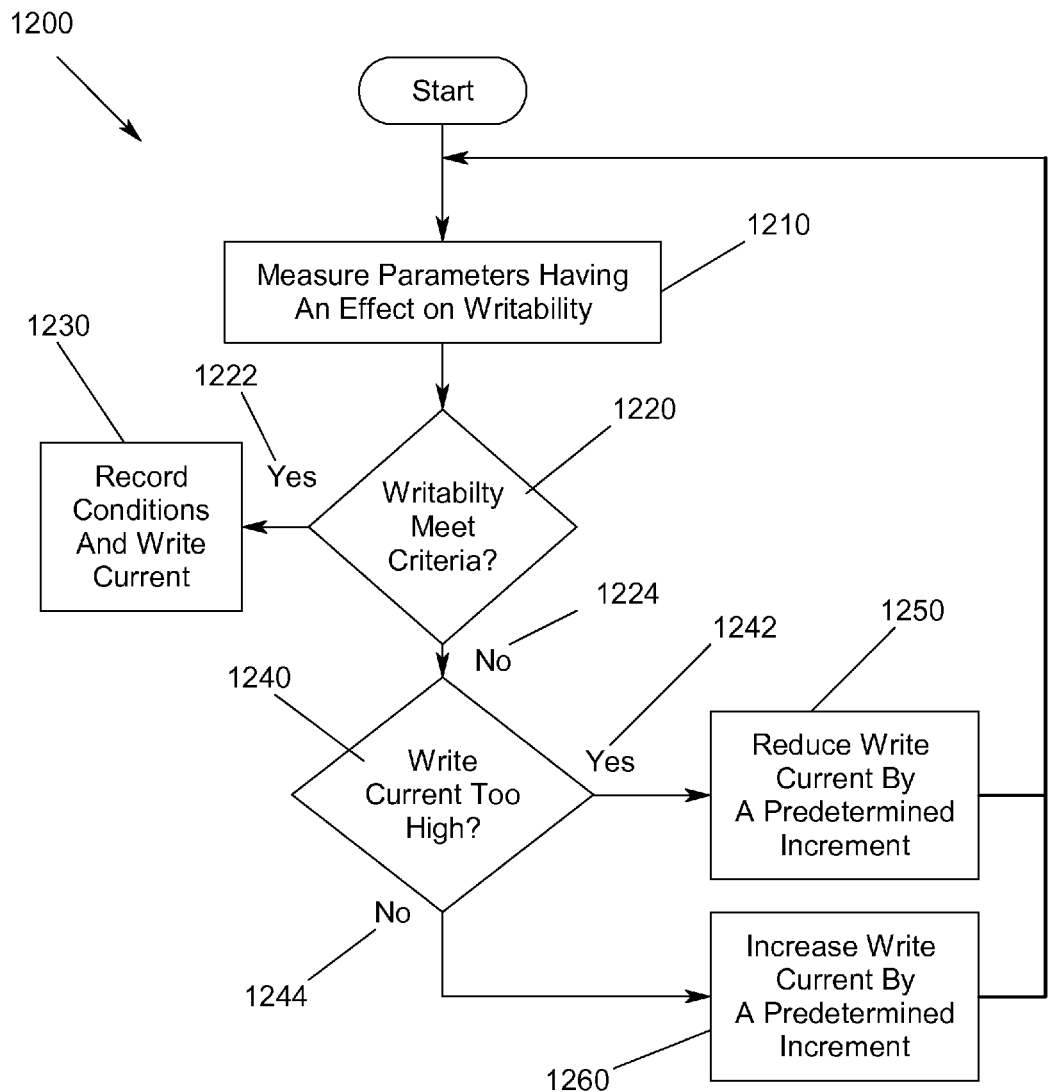
FIG. 12 is a flow chart of a method for dynamically adjusting the write current in each head to compensate for variation in disk drive and environmental parameters in accordance with an embodiment of the present invention.

FIG. 12 is a flow chart 1200 of a method for dynamically adjusting the write current in each head to compensate for variation in disk drive and environmental parameters in accordance with an embodiment of the present invention. For example, a measurement included in most modern disk drives is the amount of overwrite. Thus, hereafter an example of a method for dynamically adjusting the write current in accordance with an embodiment of the present invention will be based on overwrite measurements. However, those skilled in the art will recognize that the present invention is not meant to be limited to measuring only overwrite. Rather, the concepts in embodiments of the present invention may be extended for any variation in disk drive and environmental parameters.

Overwrite is a measure of the write head writing over information previously written on the media when writing new information. In general, there is a small residual of the previous information in any magnetic interface. In most cases, this residual is so small that it does not interfere with the ability to detect the new information. In some cases, however, when overwrite is excessive, the new information cannot be retrieved from the detected data. As we have seen, that is a result of the inability of the write to adequately write the media for all the reasons mentioned earlier. Fundamental to this invention is the ability to measure performance as a function of write current and the ability to adjust the write current appropriately.

Referring to FIG. 12, at some particular region on the media, parameters having an effect on writability are measured 1210. A determination is made whether the writability meets the predetermined criteria 1220. If the writability meets the criteria 1222, the conditions and write current are recorded 1230. If the writability does not meet the predetermined criteria 1224, a determination is made whether the write current is too high 1240, i.e., above the criteria. If the write current 1242, the current is reduced in incremental steps until the writability meets the criteria 1250. If the write current is too low 1244, the write current is increased until the writability meets the criteria 1260. In this manner, all of the head disk interfaces will be tailored to the particular head and media surface in the interface. An example might be that the write current should be adjusted such that the overwrite is always between 25 db and 27 db.

In addition, a process in accordance with an embodiment of the present invention, lends itself to adjusting the interface as the initial flying height of the head varies. But in addition the flying height varies as the slider is moved from the outer diameter to the inner diameter (OD to ID). In the limit each track could have an associated write current. More practically, the tracks could be grouped into bands such that each band could have an associated read current.

Thus, a dynamic kick to the write current may be used to contain initial variations in the components. However, in addition to the initial variations in the components, compensation for aging of the parts and varying environmental conditions may also be provided. For example, atmospheric pressure is a significant factor is determining the flying height. Consequently, the write circuitry has to be designed such that the head will write adequately at all expected altitudes. A disk drive that performs well at sea level may have excessive write current at higher altitudes. The write current can be readjusted periodically to compensate for altitude. In addition, as the interface wears, debris can be accumulated on the slider. In some cases, this debris may decrease the flying height and in others it may increase the flying height. The dynamic kick process, if applied periodically, would compensate for these variations.

The process illustrated with reference to FIGS. 1-12 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for dynamically adjusting the write current in a write head, comprising:

monitoring a plurality of parameters affecting writability of a write head of a disk drive to detect a difference in the ability of the write head to write information on the media as the difference occurs due to any variation in magnetic characteristics of the recording medium, any variation in head mechanical characteristics and any variation in environmental parameters; and dynamically adjusting write current in response to detecting the difference in writability as the difference occurs during the monitoring of the plurality of parameters affecting writability of the write head to the recording medium to account for any variation in magnetic characteristics of the recording medium, any variation in head mechanical characteristics and any variation in environmental parameters until writability of the write head to the recording medium meets a predetermined criteria.

2. The method of claim 1, wherein the monitoring writability of a write head to the recording medium further comprises measuring at least one parameter affecting writability of a write head to the recording medium and determining whether the measured parameter meets predetermined criteria.

3. The method of claim 2, wherein the measuring at least one parameter affecting writability of a write head to the recording medium further comprises measuring variations comprising at least one variation selected from the group consisting of flying height, media coercivity, write current, write head material, media thickness, media magnetic remanence, temperature measurement accuracy, magnetic remanence, write pole size and pole tip geometry variations.

4. The method of claim 2, wherein the determining whether the measured parameter meets predetermined criteria further comprises determining whether the write current needs to be increased or decreased based upon the measured at least one parameter and increasing the write current until the predetermined criteria is met when the write current is determined to require increasing and decreasing the write current until the predetermined criteria is met when the write current is determined to require decreasing.

5. The method of claim 1, wherein the dynamically adjusting write current comprises adjusting a write current based upon temperature changes.

6. The method of claim 5, wherein adjusting the write current further comprises increasing the write current at low temperatures where the coercivity of the recording medium is high and lowering the write current at high temperatures where the coercivity of the recording medium is low.

7. The method of claim 5, wherein the adjusting the write current further comprises setting the write current inversely proportional to the measured temperature.

8. The method of claim 1, wherein the dynamically adjusting the write current further comprises determining at least one switch point for adjusting the write current and changing the write current at the at least one switch point to account for thermal characteristics of the recording medium.

9. A data storage system, comprising:
a recording medium for storing data thereon;
a transducer disposed proximate the recording medium for reading and writing data on the recording medium;
an actuator, coupled to the transducer, for moving the transducer relative to the recording medium; and
a signal processing system, coupled to the transducer, the signal processing system being configured for monitoring a plurality of parameters affecting writability of a write head of a disk drive to detect a difference in the ability of the write head to write information on the media as the difference occurs due to any variation in magnetic characteristics of the recording medium, any variation in head mechanical characteristics and any variation in environmental parameters and dynamically adjusting write current in response to detecting the difference in writability as the difference occurs during the monitoring of the plurality of parameters affecting writability of the write head to the recording medium to account for any variation in magnetic characteristics of the recording medium, any variation in head mechanical characteristics and any variation in environmental parameters until writability of the write head to the recording medium meets a predetermined criteria.

10. The data storage system of claim 9, wherein the monitoring writability of a write head to the recording medium further comprises measuring at least one parameter affecting writability of a write head to the recording medium and determining whether the measured parameter meets predetermined criteria.

11. The data storage system of claim 10, wherein the measuring at least one parameter affecting writability of a write head to the recording medium further comprises measuring variations comprising at least one variation selected from the group consisting of flying height, media coercivity, write current, write head material, media thickness, media magnetic remanence, temperature measurement accuracy, magnetic remanence, write pole size and pole tip geometry variations.

12. The data storage system of claim 10, wherein the determining whether the measured parameter meets predetermined criteria further comprises determining whether the write current needs to be increased or decreased based upon the measured at least one parameter and increasing the write current until the predetermined criteria is met when the write current is determined to require increasing and decreasing the write current until the predetermined criteria is met when the write current is determined to require decreasing.

13. The data storage system of claim 9, wherein the dynamically adjusting write current comprises adjusting a write current based upon temperature changes.

14. The data storage system of claim 13, wherein adjusting the write current further comprises increasing the write current at low temperatures where the coercivity of the recording medium is high and lowering the write current at high temperatures where the coercivity of the recording medium is low.

15. The data storage system of claim 13, wherein the adjusting the write current further comprises setting the write current inversely proportional to the measured temperature.

16. The data storage system of claim 9, wherein the dynamically adjusting the write current further comprises determining at least one switch point for adjusting the write current and changing the write current at the at least one switch point to account for thermal characteristics of the recording medium.

17. A data storage system, comprising:
means for storing data thereon;
means for translating the means for storing data;
means, disposed proximate the means for storing data, for reading and writing data on the means for storing data;
means, coupled to the means for reading and writing data, for moving the means for reading and writing data relative to the means for storing data; and
means, coupled to the means for reading and writing data, for monitoring a plurality of parameters affecting writability of a write head of a disk drive to detect a difference in the ability of the write head to write information on the media as the difference occurs due to any variation in magnetic characteristics of the recording medium, any variation in head mechanical characteristics and any variation in environmental parameters and dynamically adjusting write current in response to detecting the difference in writability as the difference occurs during the monitoring of the plurality of parameters affecting writability of the write head to the recording medium to account for any variation in magnetic characteristics of the recording medium, any variation in head mechanical characteristics and any variation in environmental parameters until writability of the write head to the recording medium meets a predetermined criteria.

18. A non-transitory computer-readable medium tangibly embodying a program instructions executable by a processing device to cause the processing device to perform operations for dynamically adjusting the write current in each head in a storage system to compensate for variation in storage system and environmental parameters, the operations comprising:
monitoring a plurality of parameters affecting writability of a write head of a disk drive to detect a difference in the ability of the write head to write information on the media as the difference occurs due to any variation in magnetic characteristics of the recording medium, any variation in head mechanical characteristics and any variation in environmental parameters; and dynamically adjusting write current in response to detecting the difference in writability as the difference occurs during the monitoring of the plurality of parameters affecting writability of the write head to the recording medium to account for any variation in magnetic characteristics of the recording medium, any variation in head mechanical characteristics and any variation in environmental parameters until writability of the write head to the recording medium meets a predetermined criteria.

19. The non-transitory computer-readable medium of claim 18, wherein the monitoring writability of a write head to the recording medium further comprises measuring at least one parameter affecting writability of a write head to the recording medium and determining whether the measured parameter meets predetermined criteria.

20. The non-transitory computer-readable medium of claim 19, wherein the measuring at least one parameter affecting writability of a write head to the recording medium further comprises measuring variations comprising at least one variation selected from the group consisting of flying height, media coercivity, write current, write head material, media thickness, media magnetic remanence, temperature measurement accuracy, magnetic remanence, write pole size and pole tip geometry variations.

21. The non-transitory computer-readable medium of claim 19, wherein the determining whether the measured parameter meets predetermined criteria further comprises determining whether the write current needs to be increased or decreased based upon the measured at least one parameter and increasing the write current until the predetermined criteria is met when the write current is determined to require increasing and decreasing the write current until the predetermined criteria is met when the write current is determined to require decreasing.

22. The non-transitory computer-readable medium of claim 18, wherein the dynamically adjusting write current comprises adjusting a write current based upon temperature changes.

23. The non-transitory computer-readable medium of claim 22, wherein adjusting the write current further comprises increasing the write current at low temperatures where the coercivity of the recording medium is high and lowering the write current at high temperatures where the coercivity of the recording medium is low.

24. The non-transitory computer-readable medium of claim 22, wherein the adjusting the write current further comprises setting the write current inversely proportional to the measured temperature.

25. The non-transitory computer-readable medium of claim 18, wherein the dynamically adjusting the write current further comprises determining at least one switch point for adjusting the write current and changing the write current at the at least one switch point to account for thermal characteristics of the recording medium.

* * * * *